United States Patent
Kim

(10) Patent No.: US 8,811,454 B2
(45) Date of Patent: Aug. 19, 2014

(54) SYNCHRONIZATION ACQUISITION METHOD OF REAL TIME LOCATING SYSTEM

(75) Inventor: Jae Wook Kim, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 25 days.

(21) Appl. No.: 13/533,904

(22) Filed: Jun. 26, 2012

(65) Prior Publication Data

US 2013/0003786 A1 Jan. 3, 2013

(30) Foreign Application Priority Data

Jun. 28, 2011 (KR) ........................ 10-2011-0062611

(51) Int. Cl.
*H04B 1/7073* (2011.01)
*H04B 1/7075* (2011.01)

(52) U.S. Cl.
CPC .... *H04B 1/7073* (2013.01); *H04B 2201/70715* (2013.01); *H04B 1/70755* (2013.01)
USPC ........... 375/149; 375/130; 375/140; 375/141; 375/142; 375/143; 375/145; 375/147; 375/150; 375/152; 375/316; 375/354; 375/359; 375/365; 375/367

(58) Field of Classification Search
USPC ......... 375/130, 140, 141, 142, 143, 145, 147, 375/149, 150, 152, 316, 354, 359, 365, 367, 375/368
See application file for complete search history.

(56) References Cited

U.S. PATENT DOCUMENTS 6,748,224 B1 6/2004 Chen et al.

FOREIGN PATENT DOCUMENTS

| CN | 1128064 | 7/1996 |
|---|---|---|
| CN | 1228643 | 9/1999 |
| CN | 1784612 | 6/2006 |
| CN | 101436877 | 5/2009 |
| CN | 102082998 | 6/2011 |
| KR | 10-2000-0066195 | 11/2000 |
| KR | 10-2001-0064729 | 7/2001 |
| KR | 10-0755641 | 9/2007 |

OTHER PUBLICATIONS

The State Intellectual Property Office of the People's Republic of China Application Serial No. 201210223100.1, Office Action dated Mar. 5, 2014, 6 pages.

*Primary Examiner* — Siu Lee
(74) *Attorney, Agent, or Firm* — Lee, Hong, Degerman, Kang & Waimey

(57) ABSTRACT

Provided are a method for dynamically acquiring a PN synchronization of a blink signal in a reader according to a channel state when a tag transmits a direct sequence spread spectrum (DSSS) blink signal having a predetermined period and the reader receives the blink signal in a 2.4 GHz RTLS system which complies with an ISO/IEC24730-2 standard, and a method for synchronizing a frame using a preamble.

4 Claims, 9 Drawing Sheets

FIG.9

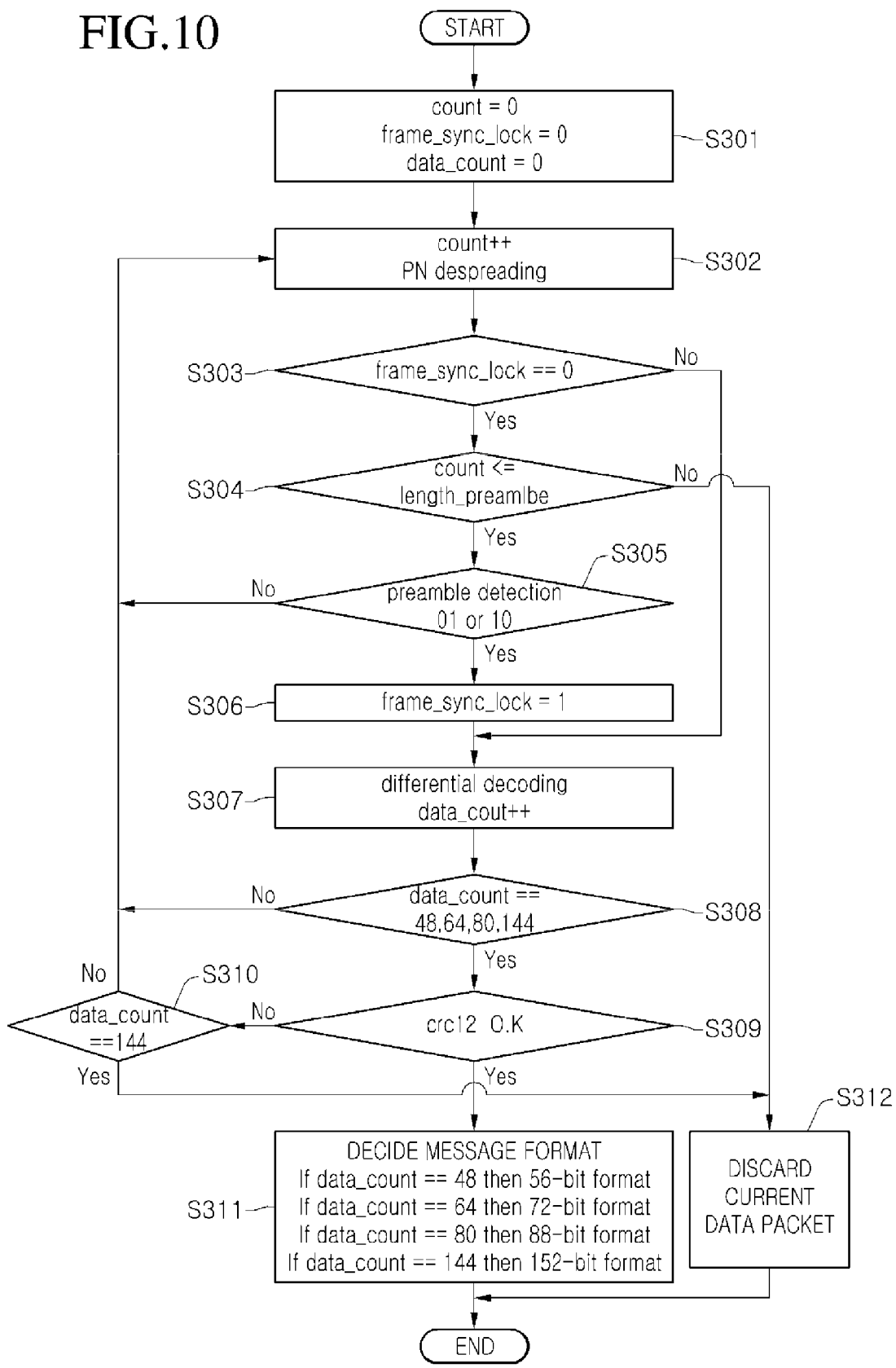

SYNCHRONIZATION ACQUISITION METHOD OF REAL TIME LOCATING SYSTEM

CROSS-REFERENCE TO RELATED APPLICATIONS

Pursuant to 35 U.S.C. §119(a), this application claims the benefit of earlier filing date and right of priority to Korean Patent Application No. 10-2011-0062611, filed on Jun. 28, 2011, the contents of which are hereby incorporated by reference herein in its entirety.

BACKGROUND

Embodiments relates to a real time location system (RTLS), and more particularly, to a PN synchronization or frame synchronization acquisition method of an RTLS.

Furthermore, embodiments relates to a method for dynamically acquiring a PN synchronization of a blink signal in a reader according to a channel state when a tag transmits a direct sequence spread spectrum (DSSS) blink signal having a predetermined period and the reader receives the blink signal in a 2.4 GHz RTLS system which complies with an ISO/IEC24730-2 standard, and a method for synchronizing a frame using a preamble.

In a RTLS system using a 2.4 GHz frequency band complying with an ISO/IEC24730-2 standard, an RTLS transmitter (or tag) periodically transmits a differentially encoded binary phase shift keying direction sequence spread spectrum (BPSK DSSS) signal including an RTLS transmitter ID into readers as a blink signal.

The plurality of readers disposed around the tag receive a transmitting signal of the tag to transmit the signal into a positioning engine of an RTLS server. The positioning engine of the RTLS server receives the transmitting signal of the tag from each of the readers to calculate a position of the tag through a time difference of arrival (TDOA) from the tag to each of the readers.

For example, when the tag is calculated in position on the basis of a TDOA read by two readers, a pair of hyperbolas may be defined by a difference of a distance measured using the readers as fixed points. Here, a point of intersection between the hyperbolas may be estimated as the position of the tag.

As described above, an ISO/IEC 24730-2 standard according to a related art may estimate a position of a tag using a TDOA of a transmitting signal of the tag received from a reader.

Here, in the ISO/IEC 24730-2 standard, a wireless transmitting channel is premised on a ling of sight (LOS), and a preamble is only 8 bits. However, in actual wireless communication channel environments, wireless signals may be attenuated, reflected, scattered, and refracted by an air temperature, a change of humidity, various obstructions, and the like.

If frequency synchronization within a short preamble of 9 bits, phase synchronization, PN synchronization and despreading, and data packet are not performed on a received signal affected by the unstable wireless transmitting channel, it may be difficult to decode data. Thus, a method in which synchronization is acquired even within a short preamble to decode desired date is required.

Also, to acquire PN synchronization in the other DSSS system according to a related art, a threshold valve of PN synchronization acquisition and a convergent range of PN synchronization tracking should be separately set according to each of channels and systems.

SUMMARY

Embodiments provide a method for dynamically and adaptively setting a threshold that serves as a reference when PN synchronization is locked in a received signal according to wireless channel environments when a reader receives a blink signal of a differential coded BPSK DSSS from a tag in an RTLS system which complies with an ISO/IEC24730-2 standard.

Embodiments also provide a method for synchronizing a PN code within a short 8-bit preamble on the basis of the decided threshold.

Embodiments also provide a method for acquiring data packet synchronization using the preamble after despreading through the PN synchronization is performed to decode a symbol (bit).

Embodiments also provide a method for accurately tracking a position of the tag by accurately decoding the blink signal in the reader through the above-described processes.

The feature of the present disclosure is not limited to the aforesaid, but other features not described herein will be clearly understood by those skilled in the art from descriptions below.

In one embodiment, a PN synchronization method for performing PN synchronization of a direct sequence spread spectrum (DSSS)-modulated blink input signal includes: receiving an input signal from a tag; calculating a threshold on the basis of an expected value with respect to N input signals; calculating a punctual correlation, an early correlation, and a late correlation with respect to the N input signals; and determining whether the PN synchronization with respect to the N input signals is locked on the basis of a different value obtained using the threshold, the punctual correlation, the early correlation, or the late correlation.

In another embodiment, a frame synchronization method for performing frame synchronization of a direct sequence spread spectrum (DSSS)-modulated blink input signal includes: receiving an input signal from a tag; performing PN synchronization; performing DSSS despreading using the synchronized PN synchronization; decoding the despread signal; acquiring 7th and 8th bits of a 8-bit preamble of the decoded signal; and performing differential decoding to generate a data packet.

The details of one or more embodiments are set forth in the accompanying drawings and the description below. Other features will be apparent from the description and drawings, and from the claims.

BRIEF DESCRIPTION OF THE DRAWINGS

FIG. 9 is a block diagram illustrating a configuration of the reader according to an embodiment.

FIG. 10 is a flowchart illustrating a process for acquiring frame synchronization using a preamble according to an embodiment.

DETAILED DESCRIPTION OF THE EMBODIMENTS

Figure 1:
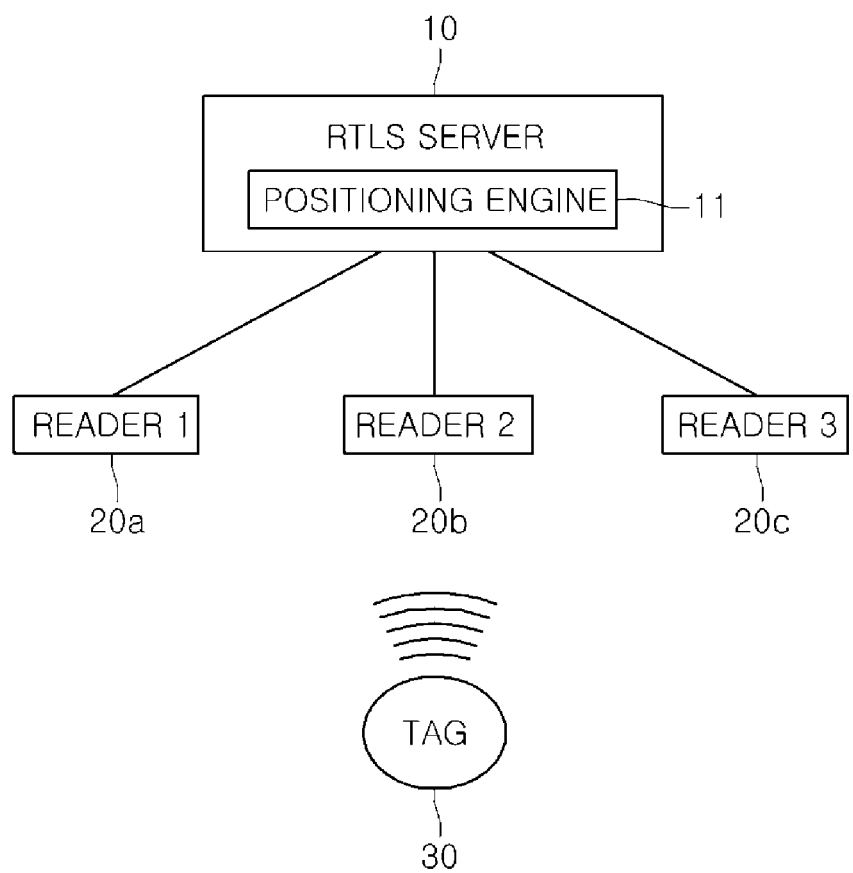
FIG. 1 is a network diagram illustrating a configuration of a real time location system (RTLS)-based location tracking system according to an embodiment.

Since the present disclosure may have diverse modified embodiments, preferred embodiments are illustrated in the drawings and are described in the detailed description of the invention.

However, this does not limit the present disclosure within specific embodiments and it should be understood that the present disclosure covers all the modifications, equivalents, and replacements within the idea and technical scope of the present disclosure.

It will be understood that although the terms of first and second are used herein to describe various elements, these elements should not be limited by these terms. Terms are only used to distinguish one component from other components. Therefore, a component referred to as a first component in one embodiment can be referred to as a second component in another embodiment. The term and/or includes any and all combinations of one or more of the associated listed items.

Unless terms used in the present invention are defined differently, the terms may be construed as meaning known to those skilled in the art. Terms such as terms that are generally used and have been in dictionaries should be construed as having meanings matched with contextual meanings in the art. In this description, unless defined clearly, terms are not ideally, excessively construed as formal meanings.

Exemplary embodiments of the present disclosure will be described below in more detail with reference to the accompanying drawings. Like reference numerals refer to like elements throughout, and their duplicated descriptions will be omitted.

FIG. 1 is a network diagram illustrating a configuration of a real time location system (RTLS)-based location tracking system according to an embodiment.

Referring to FIG. 1, the RTLS-based location tracking system according to an embodiment includes an RTLS server 10, a plurality of readers 20a, 20b, and 20c connected to the RTLS server 10 through a wire, and a tag 30 transmitting/receiving a wireless signal (for example, a signal having a frequency of about 2.4 GHz) to/from the readers 20a, 20b, and 20c.

The RTLS-based location tracking system may follow an ISO/IEC 24830-2 standard. The readers 20a, 20b, and 20c may be referred to as an "infra-structure", and the tag 30 may be referred to as an "RTLS transmitter".

FIGS. 2 to 6 are views for explaining a process for transmitting a blink signal from a tag to a reader according to an embodiment.

Figure 2:
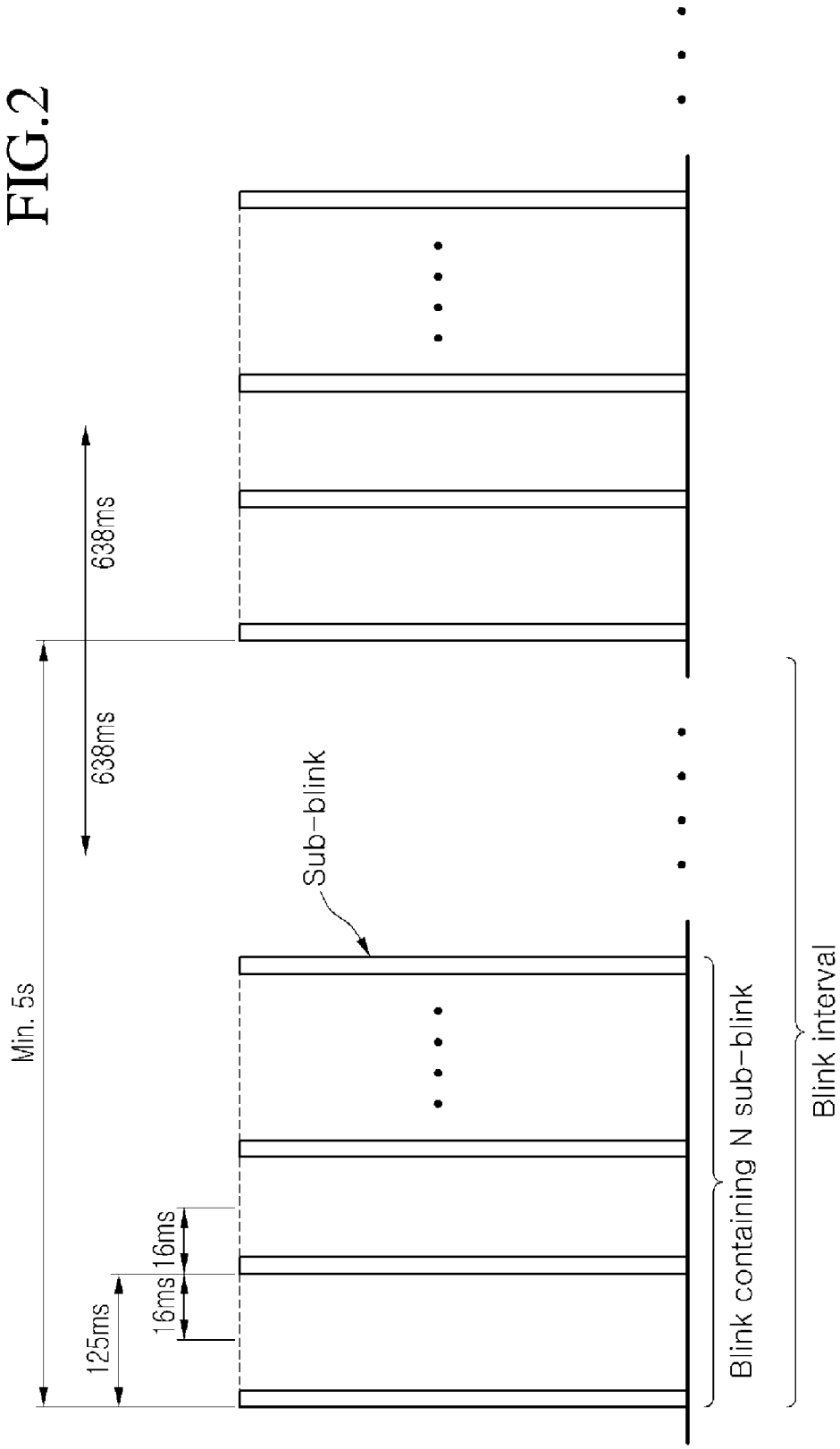
FIGS. 2 to 6 are views for explaining a process for transmitting a blink signal from a tag to a reader according to an embodiment.

Referring to FIG. 2, in the RTLS system according to the ISO/IEC 24830-2 standard, the tag emits a blink signal having a period of at least 5 seconds or more about ±638 ms or emits a sub-blink signal having the same maximum 8 data with an interval of about 125 ms±16 ms per each blink.

The blink or the sub-blink signal may be a differentially coded binary phase shift key (BPSK) DSSS type data packet. Also, the blink or the sub-blink signal include a tag ID and tag data information.

Figure 3:
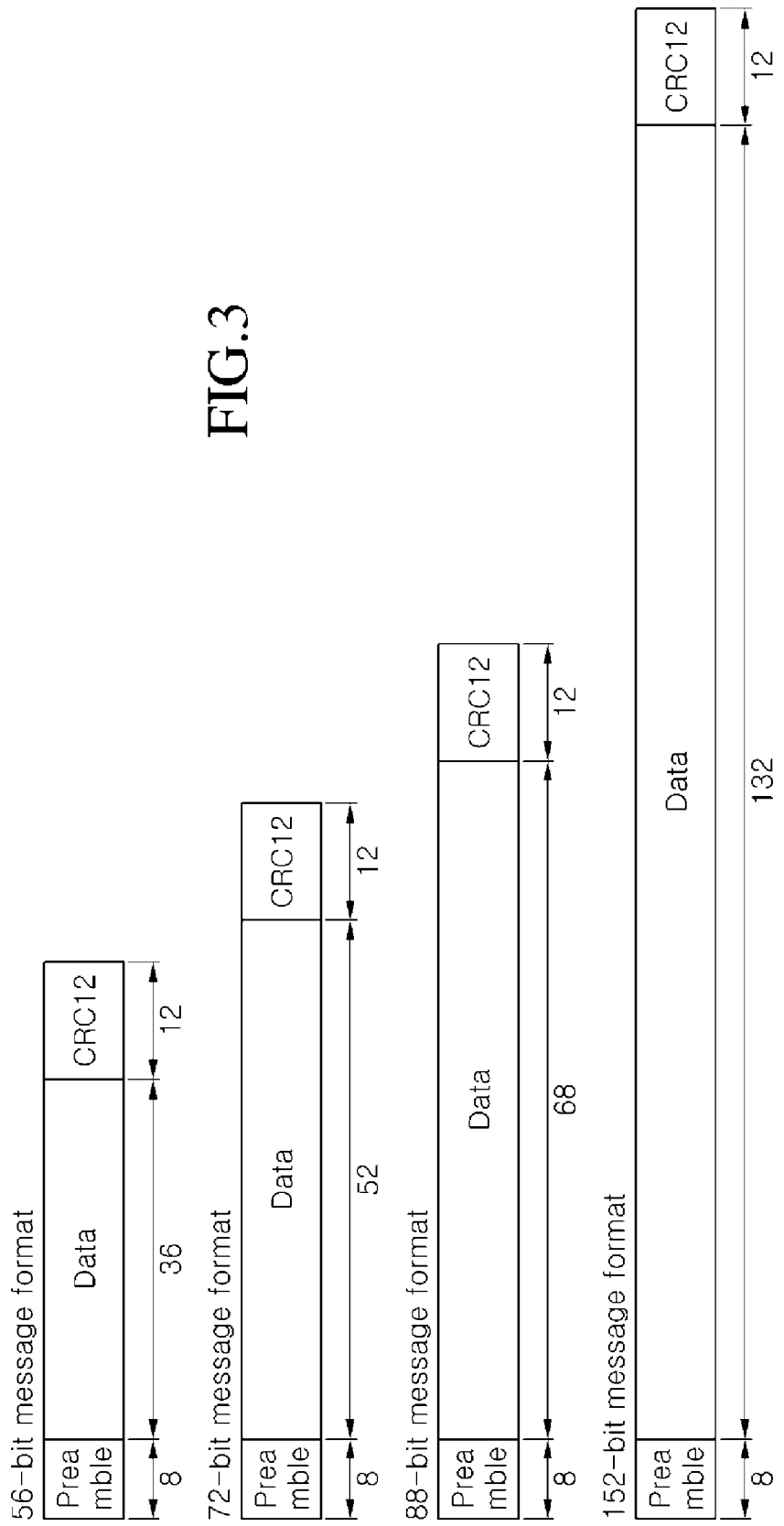

Referring to FIG. 3, a blink signal message has one of four formats of 56 bits, 72 bits, 88 bits, and 152 bits. Here, the message includes a preamble, data, and a CRC12.

The preamble has a $00000001_{(2)}$ value, and the data includes a tag state, a tag ID, and a payload. Here, the message may include a 12-bit CRC12 to perform an error check for transmitting data at a receiving terminal.

Figure 4:
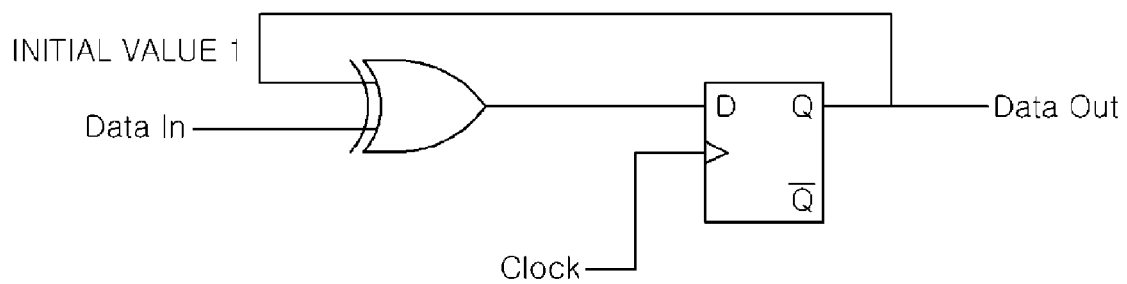

As described above, the message is constituted by the preamble, the data, and the CRC12 to perform differential coding using a method of FIG. 4. In the differential coding, a former output valve and a current input value are XOR-operated to produce an output valve. The differentially coded transmitting message format is identical to FIG. 5.

Figure 6:
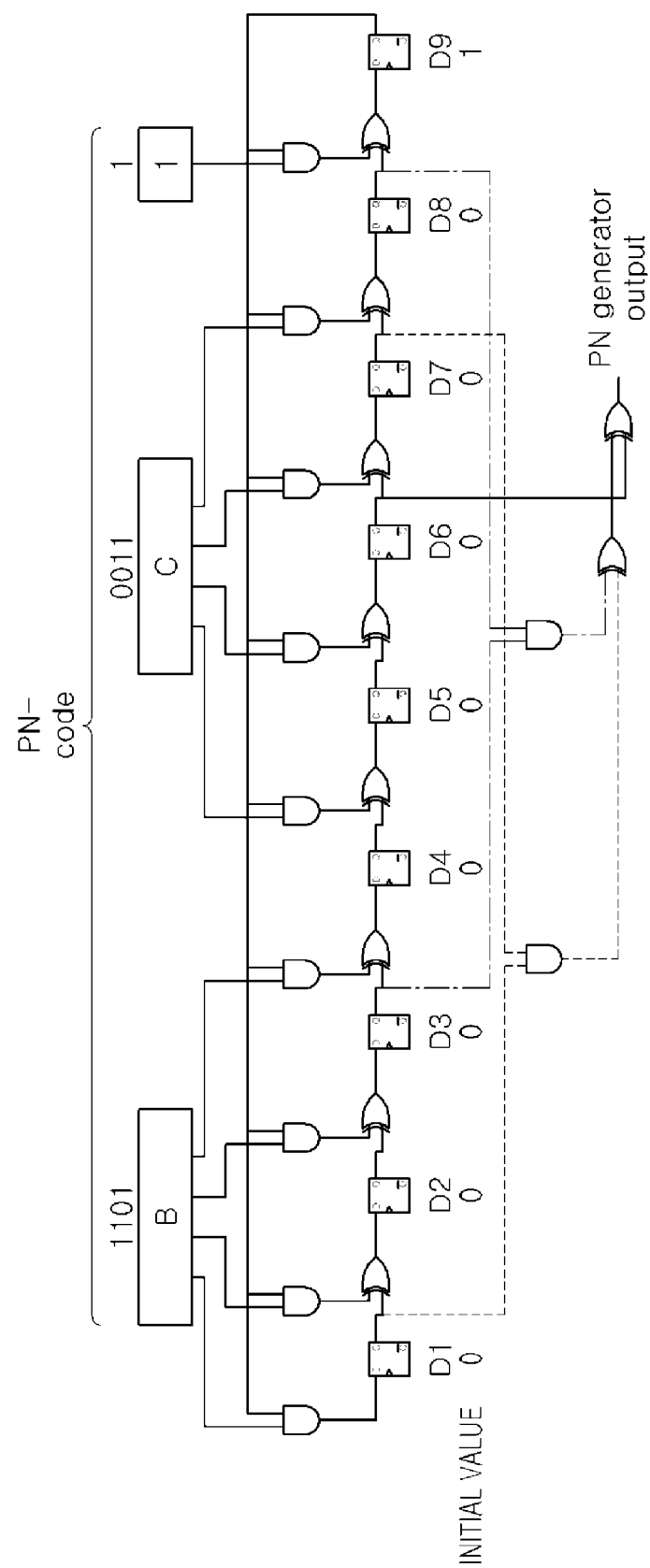

The differentially coded data message is XOR-operated with 511 PN codes generated in a PN generator as shown in FIG. 6 to perform a DSSS process on the data. Then, the data is BPSK-modulated and emitted in a blink form.

Here, the used PN spreading code may be 0x1CB. Also, a center frequency may be about 2441.750 MHz, a PN chip rate may be about 30.521875 MHz±25 ppm, and a PN code length may be about 511. Also, an occupied channel bandwidth may be about 60 MHz.

Figure 7:
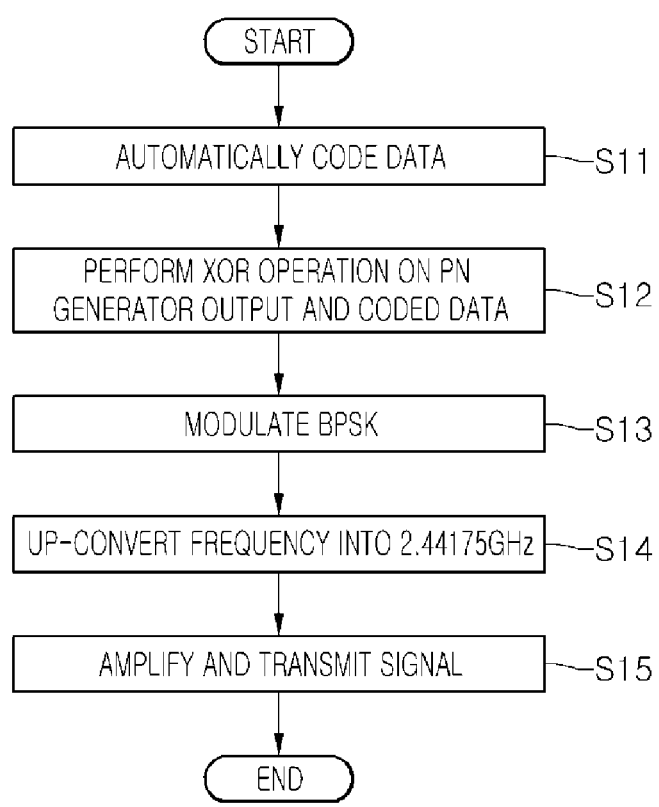
FIG. 7 is a flowchart illustrating a blink signal transmitting method in a tag according to an embodiment.

FIG. 7 is a flowchart illustrating a blink signal transmitting method in a tag according to an embodiment.

Figure 5:
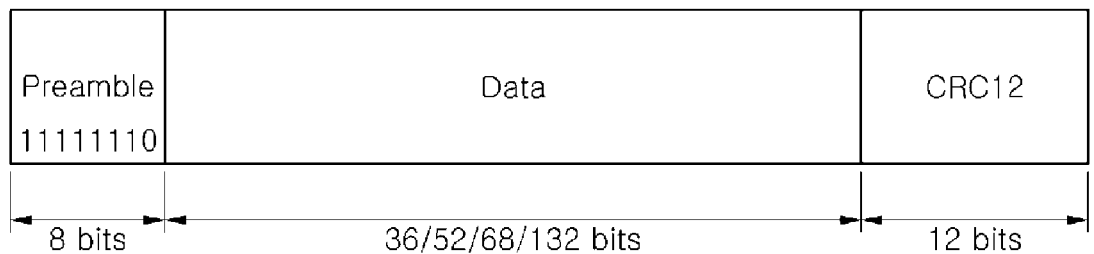

A message including a preamble, data, and a CRC12 is formed. Then, in operation S11, a tag differentially codes the message to form a transmitting message as shown in FIG. 5.

In operation S12, tag XOR operates an output of the PN generator and the differential coded transmitting message to performing DSSS spreading. Here, the used PN spreading code may be 0x1CB.

In operation S13, the tag BPSK-modulates the DSSS-spread data. In operation S14, the modulated data is up-converted into a frequency of about 2.44175 GHz. In operation S15, the signal is amplified and then emitted.

The blink signal emitted through the above-described processes is received by readers disposed around the tag. The readers receive the transmitting signal of the tag to transmit the signal into a positioning engine of a RTLS server. Here, the plurality of readers may be previously synchronized with each other.

The positioning engine of the RTLS server receives the transmitting signal of the tag from the each of the readers to calculate a position of the tag through a time difference of arrival (TDOA). For example, a pair of hyperbolas having a certain distance difference may be defined by a TDOA decided by a pair of readers using the readers as fixed points. Here, a point of intersection between the hyperbolas may be estimated as the position of the tag.

To estimate a precise position of the tag, the position of the tag may be estimated using a TDOA decided from at least three readers. However, the position estimation using the above-described TDOA method may be possible when the readers are previously synchronized with each other.

The readers receiving the blink signal from the tag acquires PN synchronization from the DSSS message signal within an 8-bit preamble. Thereafter, the readers despread the acquired PN synchronization through a correlator to decode bit data.

Figure 8:
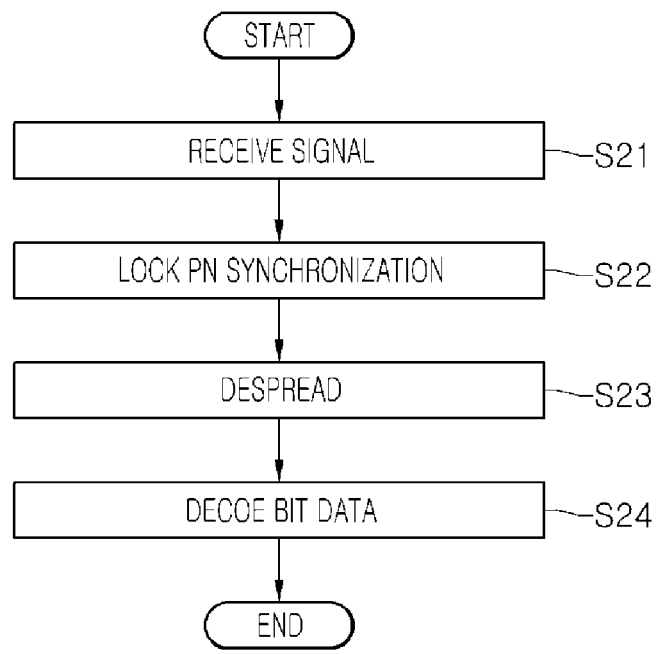
FIG. 8 is a flowchart illustrating a blink signal processing method performed in a reader according to an embodiment.

FIG. 8 is a flowchart illustrating a blink signal processing method performed in a reader according to an embodiment.

In operation S21, a reader receives a blink signal including a DSSS message signal transmitted from a tag.

In operation S22, the reader acquires PN synchronization.

In operation S23, the reader DSSS-despreads the PN synchronization through a correlator.

In operation S24, the reader decodes bit data to acquire a data symbol.

Figure 9:
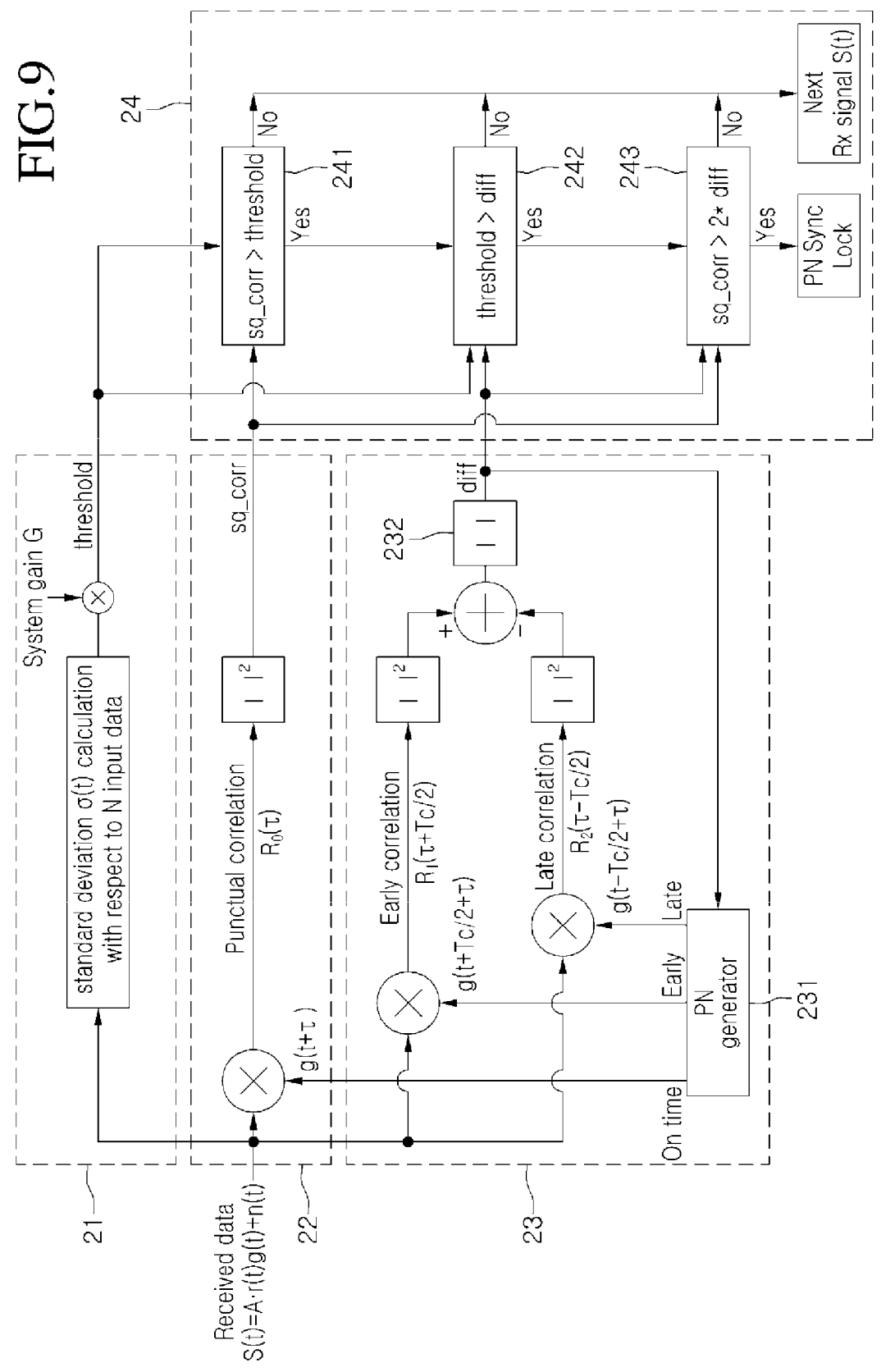

FIG. 9 is a block diagram illustrating a PN synchronization acquisition module of a reader according to an embodiment.

In a receiver of a spread spectrum system, despreading may be performed only when a PN code used in a transmitter is precisely regenerated. Here, if even one chip is not synchronized in the PN code, a correlation may approach zero, and a demodulator is not operated. Thus, it may be necessary to acquire PN synchronization.

Referring to FIG. 9, a PN synchronization acquisition module of a reader according to the current embodiment may be functionally classified into four parts such as a threshold setting 21, a square correlation 22, a delayed locked loop (DLL) 23, and a synchronization detection 24.

The PN synchronization module receives an oversampled value of a PN chip rate as an input from a signal received through a RF front end terminal. Here, the received input may be expressed by following Equation 1.

$$S(t)=A \cdot r(t)g(t)+n(t) \quad \text{(Equation 1)}$$

Where, A is signal intensity, i.e., a constant capable of being set according to an influence of a wireless channel, r(t) is bit data, g(t) is a PN code, and n(t) is a noise signal.

Here, a positioning error is defined within a radius of about 3 m in an ISO/IEC 24730-2 standard. Thus, for satisfy this, a value oversampled within a minimum 10 ns should be received as an input signal of the PN synchronization module. Also, since a PN chip rate is about 30.521875 MHz, a value greater by four times than the PN chip rate should be oversampled. If a value greater by four times than the PN chip rate is oversampled, a value sampled for each 8.19 ns may be received as an input of the PN synchronization module to search PN synchronization, thereby satisfying the ISO/IEC 24730-2 standard.

The threshold setting 21 calculates a standard deviation of input signals. For example, the threshold setting 21 calculates a standard deviation of n input signals from 1st to nth. The standard deviation may be obtained by following Equation: $E(t^2)-\{E(t)\}^2$ Where, E(t) is an expected value. Here, the standard deviation is a standard deviation of a signal in which an influence of a wireless transmission channel is reflected. Also, the threshold setting 21 may define a threshold by multiplying the standard deviation σ(t) by a system gain (G).

Here, a reason in which a value obtained by multiplying the standard deviation by the system gain is used as the threshold is because a standard deviation of a signal received according to Eb/No (a rate of noise power spectrum density to bit energy) is linearly changed.

The threshold may be used to determine whether the PN synchronization with respect to an nth sampled input signal is synchronized by comparing/determining the threshold with/from a square value sq_corr of the correlation and an output value of a noncoherent type delayed locked loop diff.

If the synchronization is not required from any one of the 1st signal to the nth signal through the square correlation 22, the DLL 23, and the synchronization detection 24, a threshold with respect to a 2nd signal to an n+1th signal is calculated to transmit the calculated threshold into the square correlation 22, the DLL 23, and the synchronization detection 24.

The square correlation 22 acquires synchronization of a PN signal, and the DLL 23 has an early-late structure to track the synchronization of the PN signal.

The square correlation 22 calculates a square sq_corr of a punctual correlation $R0_{(T)}$. The punctual correlation $R0_{(T)}$ is obtained by multiplying the received signal by the PN code generated in a PN code generator 231.

The DLL 23 calculates an absolute value difference diff between a square of an early correlation ($R_1(_T+Tc/2)$) and a square of a late correlation ($R_2(_T-Tc/2)$). Here, the early correlation is obtained by multiplying the received signal by a value in which a code generated in the PN code generator is delayed by −Tc/2. The late correlation is obtained by multiplying the received signal by a value in which a code generated in the PN code generator is delayed by Tc/2.

In the DLL 23, $R0_{(T)}$, $R_1(_T+Tc/2)$, and $R_2(_T-Tc/2)$ are auto-correlations. Here, Tc is a chip time.

The synchronization detection 24 compares the values calculated by the square correlation 22 and the DLL 23 with the threshold to determine whether the PN synchronization is locked.

In the synchronization detection 24, a first comparison 241 determines whether the square value sq_corr of the correlation is greater than the threshold, a second comparison 242 determines whether the DLL output value diff is less than the threshold, and a third comparison 243 determines whether the square value sq_corr of the correlation is greater than the 2*DLL output value diff. Thus, whether the PN synchronization is locked may be determined.

In the synchronization detection 24, whether the square value sq_corr is greater than the 2*DLL output value diff may be obtained from simulation statistics according to Eb/No (a rate of noise power spectrum density to bit energy).

When it is determined that the synchronization with respect to the 1st signal to the nth signal is locked currently by confirming whether the synchronization is locked, the despreading and decoding processes are performed. On the other hand, when it is determined that the synchronization is not locked, the above-described processes may be performed again on the 2nd signal to the N+1th signal. Also, since it is determined that the synchronization with respect to the 2nd signal to the n+1th signal is not locked, the above-described processes may be performed again on next N signals. The above-described may be repeatedly performed until the synchronization is acquired.

Here, when the PN synchronization is locked, a reader XOR-operates the input signals and the PN code for 1 bit unit to despread the synchronization, thereby demodulating symbol (bit) data.

The threshold setting 21, the square correlation 22, the DLL 23, and the synchronization detection 24 are not successively operated, but operated at the same time. However, since an initial threshold does not exist when the reader is turned on, the threshold setting 21 may be operated only when a standard deviation is obtained through N input signals.

In a DSSS system according to a related art, the synchronization of the PN code is generally performed in two stages. First, although a degree of accuracy (accuracy of the chip time Tc) is low, the synchronization of the PN signal is quickly acquired (PN acquisition). Next, the synchronization of the PN signal is accurately acquired (at a degree of accuracy less than the chip time Tc), and a change of a PN phase according to a change of the delay is tracked (PN tracking). In the ISO/IEC24730-2 standard, a data packet should searches the PN synchronization within a short 8-bit preamble. Thus, the proposed PN synchronization module is operated with a frequency of a PN chip rate (30.521875 MHZ)*oversampling (m times: m is an even integer greater than a minimum four).

That is, the threshold setting 21, the square correlation 22, the DLL 23, and the synchronization detection 24 are not successively operated, but operated at the same time. Thus, new dynamic threshold and PN synchronization acquisition and PN synchronization tracking may be performed for each clock. This is done for a reason in which the PN synchronization should be locked within the short 8-bit preamble.

Also, in the other DSSS system according to the related art, a threshold of PN synchronization acquisition and a convergent range of PN synchronization tracking should be separately set according to each of systems and transmitting channels. However, in the proposed PN synchronization system, a channel adaptive threshold is set. The channel adaptive threshold is one parameter and serves as a reference for determining whether the PN code is synchronized.

The reader extracts bit data by despreading the PN synchronization after the PN code is synchronized. Since the data packet synchronization (frame synchronization) has 8 preamble bits, 1(2) and 0(2) that are 7th and 8th bits of the preamble, respectively, are searched within 8 bits. Since reversal occurs due to an influence of the channel or phase ambiguity of a carrier wave, the 7th and 8th bits should be also searched on 0(2) and 1(2).

FIG. 10 is a flowchart illustrating a process for acquiring frame synchronization using a preamble according to an embodiment.

A frame synchronization process of FIG. 10 is performed after the operation of the PN synchronization acquisition module of FIG. 9 is completed to acquire the PN synchronization.

When data is transmitted from a transmitter as one format of 56 bit, 72 bit, 88 bit, and 152 bit message formats, a receiver receives PN synchronization and then receives frame synchronization that is data packet synchronization using the preamble. Variables illustrated in FIG. 10 are defined as follows:

count: PN despreading number (bit count)
frame_sync_lock: When 7th and 8th bits of preamble are detected, frame_sync_lock=1, and when 7th and 8th bits of preamble are not detected, frame_sync_lock=0
data_count: 48, 64, 80, 144 data numbers obtained by subtracting 8 preamble bits from 56 bit, 72 bit, 88 bit, and 152 bit message lengths, respectively
length_preamble: 8 preamble bits Referring to FIG. 10, an initial process is performed in operation S301. That is, the variables such as count, frame_sync_lock, and data_count are set to zero.

In operation s302, PN despreading bit number is increased. That is, count is increased.

In operation S303, whether frame_sync_lock=0 is determined to determine whether the 7th and 8th bits of the preamble are detected.

In operation S304, whether count<=length_preamble is determined to determine whether the current PN despreading bit count is 8 or less. When the PN despreading bit count is greater than 8 bits, the current data packet is discarded in operation S312.

In operation S305, it is determined whether preamble (01) or (10) is detected. If the preamble (01) or (10) is detected, frame_sync_lock=1 is set in operation S306 to proceed with the next process. Also, if the preamble (01) or (10) is not detected, the PN despreading bit count is increased to repeat the foregoing processes again.

Then, in operation S307, differential decoding is performed to search desired data. In operation S308, when the data_count is 48, 64, 80, or 144, CRC12 check is performed.

In operation S308, when the data_count is 48 and the CRC12 is zero, a 56 bit message becomes. Also, when the data_count is 64 and the CRC12 is zero, a 72 bit message becomes, when the data_count is 80 and the CRC12 is zero, an 88 bit message becomes, and when the data_count is 144 and the CRC12 is zero, a 152 bit message becomes.

In operation S309, when CRC12 is zero, message format is decided in operation S11. On the other hand, when CRC12 is not zero, the currently received data packet is discarded in operation S312. When CRC12 is not zero in the operation S309, whether the data_count is 144 is determined in operation S310. If the data_count is not 144, the foregoing processes are performed again. On the other hand, if the data_count is 144, this does not correspond to any message format. Thus, the currently received data packet is discarded in operation S312. As described above, the transmitted message of the four message formats may be detected through the CRC12 error detection.

In the current embodiment, a method for setting the dynamic threshold of the PN correlation value to acquire the PN synchronization and a method for using the preamble to acquire the data packet synchronization are proposed.

According to the current embodiment, the dynamic threshold in which the transmitting channel state is reflected may be set to demodulate the RTLS positioning signal to acquire the PN synchronization using the same. Also, the data packet synchronization may be detected through the preamble, and the reversed data may be detected through the differential decoding and the preamble. Thus, the positioning signal having reliability may be decoded to tract correct positions in real time.

According to the embodiment, since the threshold that serves as the reference when the PN synchronization is locked is dynamically and automatically set according to the wireless channel environments, it may be unnecessary to separately set the threshold of the PN synchronization acquisition and the convergent range of the PN synchronization tracking for each system.

According to the embodiment, the PN synchronization may be accurately acquired within the short 8-bit preamble.

According to the embodiment, the synchronization of the data packet may be acquired using the preamble.

According to the embodiment, the blink signal may be accurately decoded in the reader to accurately track the position of the tag.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. Accordingly, the present invention embraces all such alternative modifications and variations as fall within the spirit and scope of the appended claims.

What is claimed is:

1. A PN synchronization method for performing PN synchronization of a direct sequence spread spectrum (DSSS)-modulated blink input signal, the PN synchronization method comprising:
receiving an input signal from a tag;
calculating a threshold on the basis of an expected value with respect to N input signals;
calculating a punctual correlation, an early correlation, and a late correlation with respect to the N input signals; and
determining whether the PN synchronization with respect to the N input signals is locked on the basis of a different value obtained using the threshold, the punctual correlation, the early correlation, or the late correlation;
wherein the calculating of the threshold comprises calculating a standard deviation ($\sigma$) with respect to the N input signals and multiplying the standard deviation ($\sigma$) by a system gain (G).

2. The PN synchronization method according to claim 1, wherein the punctual correlation is obtained by multiplying the received signal by a code generated in a PN code generator,
- the early correlation is obtained by multiplying the received signal by a value in which the generated code is delayed by $-Tc/2$; and
- the late correlation is calculated by multiplying the received signal by a value in which the generated code is delayed by $Tc/2$.

3. The PN synchronization method according to claim 2, wherein the determining of whether the PN synchronization is locked comprises:
- calculating a square (sq-corr) of the punctual correlation;
- calculating an absolute value difference (diff) between a square of the early correlation and a square of the late correlation;
- when sq_corr>threshold, threhold>diff, and sq_corr>2*diff, locking the PN synchronization.

4. The PN synchronization method according to claim 1, when the PN synchronization is unlocked, further comprising determining whether the PN synchronization with respect to next N input signals is locked.

* * * * *